United States Patent

Kinley et al.

[15] 3,683,408

[45] Aug. 8, 1972

[54] APPARATUS FOR FORMING A RECORD ON A TAPE

[72] Inventors: John C. Kinley; Wayne D. Floeck; Charles W. Agee, all of Houston, Tex.

[73] Assignee: John C. Kinley, Houston, Tex.

[22] Filed: Sept. 4, 1970

[21] Appl. No.: 69,550

Related U.S. Application Data

[63] Continuation-in-part of Ser. No. 790,593, Jan. 13, 1969, abandoned.

[52] U.S. Cl. ..............................346/77 R, 346/139 C
[51] Int. Cl. ..............................................G01d 15/02
[58] Field of Search ........346/77, 134, 139 C, 117 R, 346/116, 114; 33/18 R; 178/6.6 B

[56] References Cited

UNITED STATES PATENTS

| | | | |
|---|---|---|---|
| 3,147,610 | 9/1964 | Mollick | 346/135 X |
| 3,401,392 | 9/1968 | Richards | 346/17 |
| 3,441,941 | 4/1969 | Bullwinkel et al. | 346/17 |

*Primary Examiner*—Joseph W. Hartary
*Attorney*—Pravel, Wilson & Matthews

[57] ABSTRACT

Apparatus for forming a record on a tape having a transparent portion and an opaque portion, whereby a stylus is adapted to cut the tape to a controlled depth so as to cut through the opaque portion of the tape without cutting through the transparent portion thereof.

5 Claims, 4 Drawing Figures

John C. Kinley
Wayne D. Floeck
Charles W. Agee
INVENTORS

BY

Pravel Wilson & Matthews
ATTORNEYS

John C. Kinley
Wayne D. Floeck
Charles W. Agee
INVENTORS

BY

Prawel Wilson & Matthews
ATTORNEYS

APPARATUS FOR FORMING A RECORD ON A TAPE

CROSS-REFERENCE TO RELATED APPLICATION

This application is a continuation-in-part of U.S. patent application, Ser. No. 790,593 filed Jan. 13, 1969, now abandoned.

BACKGROUND OF THE INVENTION

The field of this invention is apparatus for cutting a record on tape with a stylus.

Recording charts having a transparent portion and an opaque portion upon which a record is cut by pressure, heat or solvent, such as in U.S. Pat. No. 3,014,301 have been known for a long time. So far as is known, however, no apparatus has heretofore been provided wherein a roll of tape is mounted for longitudinally feeding relative to a stylus, and wherein the stylus is mounted for lateral movements with the depth of the cut by the stylus being controlled during such lateral movements of the stylus so as to limit the extent of cutting of the tape by the stylus essentially to the opaque portion.

SUMMARY OF THE INVENTION

The present invention relates to an apparatus for longitudinally moving a tape having a transparent portion and an opaque portion relative to a stylus, wherein the stylus is mounted for lateral movements relative to the tape, with the depth of the cut by the stylus being controlled during such lateral movements of the stylus to cut through the opaque portion of the tape without cutting through the transparent portion.

DESCRIPTION OF THE PREFERRED EMBODIMENT

Figure 1:
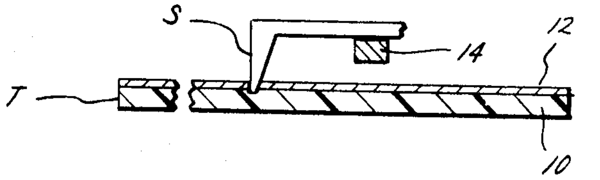
FIG. 1 is a cross-sectional view illustrating schematically the apparatus of this invention, and particularly illustrating the record tape, with a stylus in cutting engagement with the opaque portion of the tape for cutting a record therein.
Figure 2:
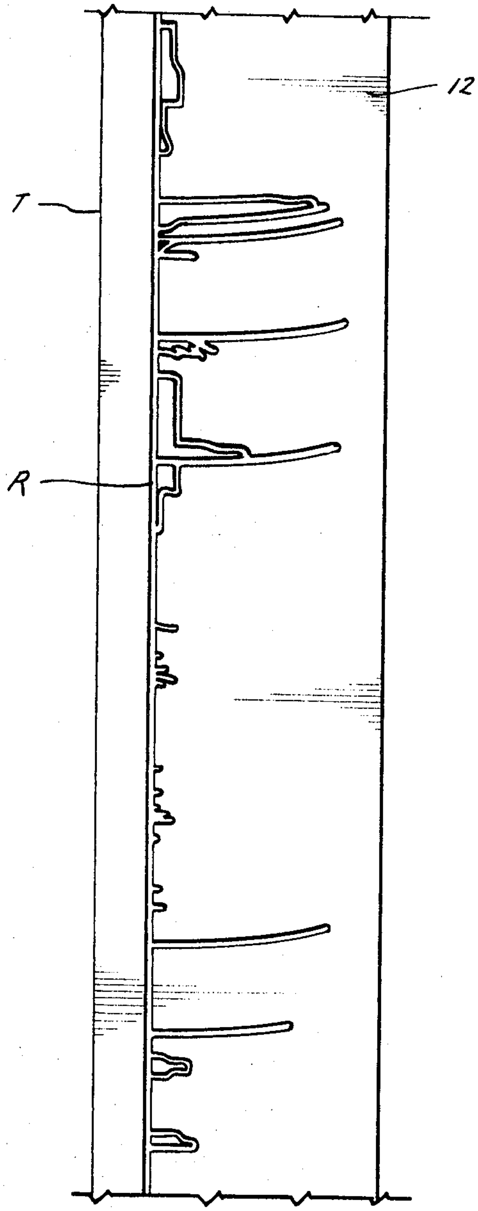
FIG. 2 is a plan view of a section of the tape of this invention, wherein typical record traces made in a well calipering tool are illustrated thereon.

In the drawings, the letter T designates generally a well caliper record tape which is a flexible tape which may be wound and unwound in a well calipering tool. As illustrated schematically in FIG. 1, one portion or layer of the tape T is adapted to be cut by a sharply pointed stylus S which is diagrammatically shown in FIG. 1, and which forms a part of the conventional well calipering tool (not shown). A record R is produced on the tape T by the cutting action of the stylus S, which record R is capable of being viewed by an operator without further processing because the record R is visible to the operator, and also such tape T may be photographically reproduced at a later time, preferably using contact printing techniques, so as to produce an economical record on paper or other similar material which may be readily folded, examined and stored. Also, multiple copies of the record R may be produced economically using the tape T.

Considering the construction of the tape T more in detail, the preferred embodiment thereof includes a base layer 10 which is formed of a flexible plastic such as a polyester sold under the trademark "Mylar" or a polyamide sold under the trademark "Kapton." The thickness of such base layer 10 is ordinarily approximately 0.001 inch.

A coating or upper layer 12 is integrally united with the base layer 10 and such coating 12 is preferably a metallic coating which is vacuum deposited in a conventional manner so as to form a tight bond with the plastic layer 10. By way of example, the metallic layer 12 is aluminum or copper, both of which are opaque materials so that light cannot pass therethrough. The base layer 10, on the other hand, is formed of a transparent material through which light can pass. However, so long as the coating 12 is complete, and prior to the forming of the record R with the stylus S, the opaque metallic material 12 prevents any light from passing to the eye of the viewer through the tape T.

Preferably, the metallic opaque layer 12 is relatively thin as compared to the base material 10, and in the preferred embodiment, the coating layer 12 is actually a thin film which is approximately 0.0001 inch in thickness. Thus, the relationship between the base layer 10 and the coating layer 12 is such that the base layer 10 is approximately ten times as thick as the layer 12 in the preferred form of the invention. The particular relationship of the thicknesses of the base material or layer 10 and the coating 12 may be varied so long as the layer 12 is relatively thin as compared to the base layer 10 so that the stylus S can cut entirely through the thickness of the film or coating 12 without cutting through the base layer 10. The point of the stylus S may penetrate the interface between the layers 10 and 12 and to some extent enter into the base layer 10 as illustrated in FIG. 1, but normally penetration of the tape T by the stylus is limited so that there is substantially no penetration or cutting by the stylus S with respect to the base layer 10. It is important however, for the cutting by the stylus S to be completely through the relatively thin film or coating 12 so as to produce the record R of trace lines through which light can pass. Suitable apparatus which may be used for limiting the penetration by the stylus S, is shown in detail in FIGS. 3 and 4 and is schematically shown in FIG. 1 as a stop element 14.

In U.S. Pat. No. 2,544,609 dated Mar. 6, 1951, a well caliper apparatus is disclosed, wherein a record of the condition of well tubing is made on a paper tape or a photographic film. In the preferred form of the invention, the apparatus of this invention utilizes the same basic apparatus as disclosed in said U.S. Pat. No. 2,544,609, but such apparatus has been modified so as to produce a record on the tape T heretofore described. Thus, in FIGS. 3 and 4, only a portion of a typical well caliper apparatus is illustrated, with the improvements over the prior art being illustrated in particular. Essentially, only the recorder portion of the well calipering tool is illustrated herein since the remainder thereof may be constructed in accordance with the prior art such as the caliper illustrated in said U.S. Pat. No. 2,544,609.

Figure 3:
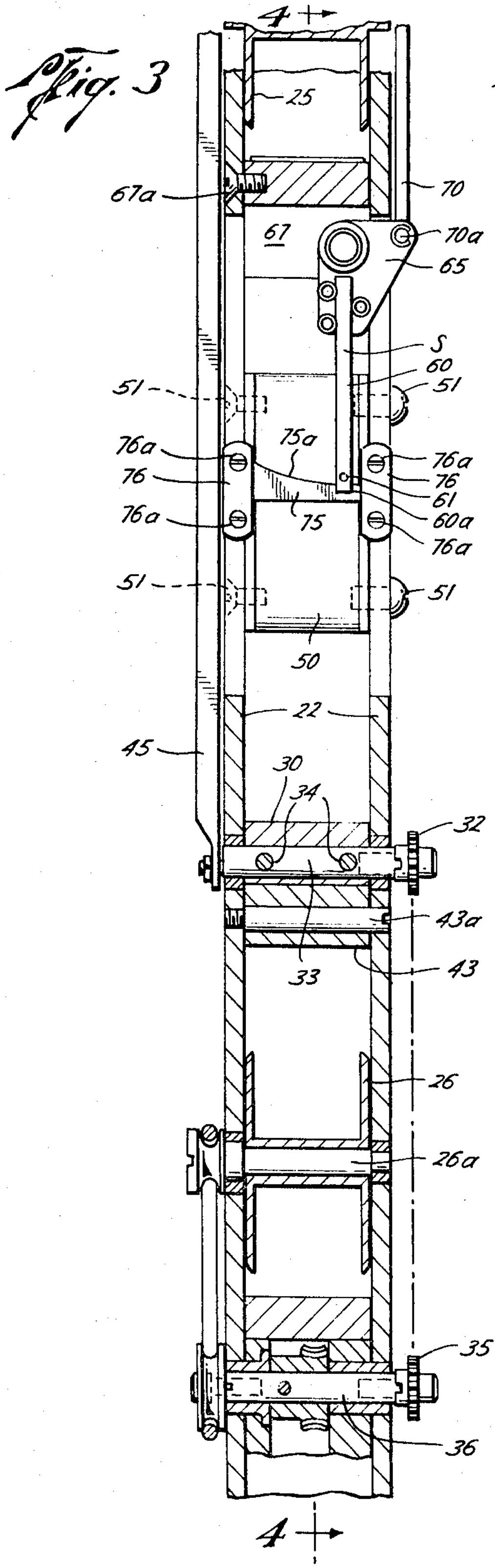
FIG. 3 is a vertical sectional view, partly in elevation, illustrating in detail the preferred form of the apparatus of this invention.
Figure 4:
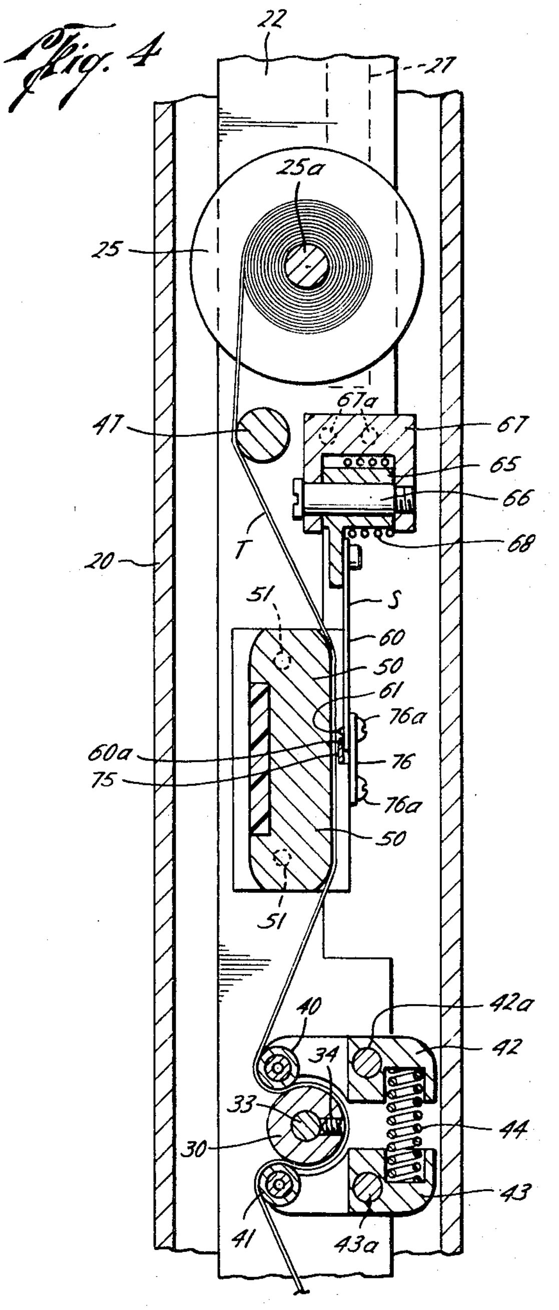
FIG. 4 is a vertical sectional view taken on line 4—4 of FIG. 3 to further illustrate the preferred apparatus of this invention.

As shown in FIG. 4, the apparatus of this invention includes a recorder housing or casing 20. Such housing 20 has been omitted from FIG. 3 for purposes of illustration, but it will be understood that the housing 20 also surrounds the apparatus in FIG. 3 since FIG. 3 is merely a side view of the same apparatus shown in FIG. 4, although FIG. 3 shows a greater extent of such apparatus at the lower portion thereof than is illustrated in FIG. 4.

A pair of spaced frame plates 22 are preferably mounted parallel to each other and these are disposed within the housing or casing 20 with suitable supports (not shown). A reel means supports the tape T within the housing 20, and it includes a supply reel 25 as well as a take-up reel 26. The reels 25 and 26 are mounted for rotation between the frame plates 22 in any suitable manner, such as by reel support pins 25*a* and 26*a*, respectively, which extend through the frame plates 22 as illustrated in the drawing. Preferably some type of friction resistance means such as a resilient arm or lever indicated at 27 (FIG. 4) engages the supply reel 25 so that as the tape T is unwound from the reel 25, the portion of the tape T which still remains on the reel 25 remains in a taut wound condition.

Since the diameter of the tape on the take-up reel 26 would gradually change as more of the tape T becomes wound thereon, the tape T is preferably fed longitudinally by means of a drive roller 30 which is mounted between the plates 22 for relative rotation. The roller 30 is driven by means of a drive sprocket 32 which is mounted on a shaft 33 disposed inside of the roller 30 and secured thereto by any suitable means such as set screws 34. The sprocket 32 is connected to a drive sprocket 35 which is mounted on a drive shaft 36 which is driven by any suitable power means within the well caliper tool, an example of which is disclosed in said U.S. Pat. No. 2,544,609. The tape T is maintained in frictional engagement with the external surface of the feed roller 30 by means of friction rollers 40 and 41 which are mounted on blocks 42 and 43, respectively. The blocks 42 and 43 are pivotally mounted on the plates 22 by pivot pins 42*a* and 43*a*, respectively, and a spring 44 urges the support blocks 42 and 43 to pivot so as to urge the friction rollers 40 and 41 towards the rollers 30 to confine the tape therebetween in frictional contact with the external surface of the drive rollers 30. A release rod 45 which forms no part of this invention is connected to one end of the shaft 33.

The tape T is fed from the supply reel 25 over a guide roller 47 which is suitably mounted between the plates 22 and then, the tape T is guided over a platen 50 which is mounted between the frame plates 22 by connecting screws or pins 51, or any other suitable attaching means.

The stylus S which is illustrated in FIG. 3 and FIG. 4 includes a flexible metal strip 60 which has a sharp cutting point 61 near its lower end. However, the lower portion of the strip 60 extends below the stylus point 61 as indicated at 60*a* (FIGS. 3 and 4) for a purpose to be hereinafter explained. The upper end of the stylus 60 is mounted in any conventional manner to a pivoted stylus support member 65, which has a pivot pin 66 therethrough for mounting in a fixed bracket 67 that is secured to one of the frame plates 22 by screws 67*a* or any other suitable securing means. A spring 68 acts to urge the stylus strip 60 in a direction towards the platen 50 at all times. The movable support 65 for the stylus S is movable laterally relative to the tape T about the pivot pin 66 in accordance with movements transmitted to the movable support 65 by a control arm or lever 70 which is connected at pin 70*a* to the movable support 65 (FIG. 3). The control arm 70 is moved in accordance with variations in the condition of the well pipe or tubing, in the manner explained in said U.S. Pat. No. 2,544,609, and as will be well understood by those skilled in the art.

The extent of movement of the stylus point 61 towards the platen 50 is limited in the present invention by means of a limit or guide plate 75 which is integral with, or is connected to a pair of connecting brackets 76 which are secured to the frame plates 22 by fastening means such as screws 76*a*. The upper edge 75*a* of the guide plate 75 is preferably curved to correspond substantially with the radius of curvature of the path of the stylus point 61 as it moves laterally relative to the tape T. The stylus point 61 thus contacts the tape T but preferably is not in contact with the guide plate 75. The lower portion 60*a* of the stylus strip 60 constantly engages the outer surface of the guide plate 75 so that the extent of penetration or cutting of the tape T by the sharp stylus point 61 is limited as it moves relative to the tape T laterally, and as the tape T moves longitudinally relative to the sharp point 61 of the stylus S. The stylus point 61 is thus limited so that it cuts through the opaque portion or layer 12 of the tape T as illustrated in FIG. 1, without appreciably cutting into the transparent or base layer or portion 10 of the tape T.

In the operation or use of the apparatus of this invention, the tape T is fed from the supply reel 25 across the platen 50 to the take-up reel 26 by the feed or drive roller 30. As the tape T is thus moved longitudinally relative to the stylus S, the record R is cut through the opaque portion 12 of the tape T without cutting through the transparent portion 10 of the tape T. When lateral movements of the stylus S occur by reason of the pivoting of the stylus strip or arm 60 about the pin 66, the limit or guide plate 75 serves to limit the extent of cutting action by the stylus point 61, so that at all times, the stylus point 61 effectively cuts through the opaque layer 12 where it contacts the tape T, but it is prevented from cutting into the transparent portion 10 of the tape T to any extent.

After the record R is thus cut into the opaque layer 12, the operator may readily view the record as it appears on the tape T. Subsequently, the tape T can be photographically reproduced by any conventional photographic process, preferably contact printing. Thus, multiple copies may be made on paper or other material which may be readily examined, folded and stored in convenient sizes. The value of the record thus produced with the tape T, using the apparatus of this invention is thus enhanced considerably as compared to the records and other information heretofore available in the well calipering field.

The foregoing disclosure and description of the invention are illustrative and explanatory thereof, and various changes in the size, shape, and materials as well as in the details of the illustrated construction may be made without departing from the spirit of the invention.

We claim:

1. Apparatus for making a record, comprising:

a flexible tape having a transparent portion and an opaque portion;

a stylus having a sharp cutting point thereon adapted to engage said opaque portion of said flexible tape;

means mounting said tape for longitudinal movement relative to said stylus;

means mounting said stylus for resiliently urging said sharp cutting point of said stylus relative to and in a direction towards said tape for cutting through said opaque portion of said tape as said tape is moved longitudinally relative to said stylus;

means for moving said stylus laterally relative to said tape as said tape moves longitudinally relative to said stylus; and guide plate means having a guide surface in sliding engagement with a portion of said stylus at all times so as to limit the movement of said stylus in the direction towards said tape at all times for thereby limiting the depth of the cut by said cutting point of said stylus as it moves relative to said tape to prevent cutting through said transparent portion.

2. The structure set forth in claim 1, wherein:

said means mounting said stylus includes a pivot mounting means for pivotally moving said point of said stylus and disposed near one longitudinal side of said tape; and said guide plate means includes an upper edge which is shaped to correspond approximately to the path of lateral movement of said sharp cutting point of said stylus so that said stylus is guided as it pivots about said pivot mounting means but so that said guide plate does not interfere with the lateral movements of said stylus relative to said tape.

3. The apparatus set forth in claim 1, wherein:

the thickness of said opaque portion is thin as compared to the thickness of said transparent portion.

4. The apparatus set forth in claim 3, wherein:

said transparent portion is a flexible plastic; and said opaque portion is a metal layer which has been deposited on said transparent portion.

5. The apparatus set forth in claim 1, including:

a platen over which said tape is adapted to move and which is disposed opposite said stylus; and reel means supporting said tape for movement across said platen, including a supply reel on one side of said platen and a take-up reel on the other side of said platen.

* * * * *